US012465539B1

(12) United States Patent
Bowen et al.

(10) Patent No.: US 12,465,539 B1
(45) Date of Patent: Nov. 11, 2025

(54) ADJUSTABLE HEADREST

(71) Applicants: Brian Scott Bowen, Greenwood Village, CO (US); Hsiang-Feng Chen Carroll, Greenwood Village, CO (US)

(72) Inventors: Brian Scott Bowen, Greenwood Village, CO (US); Hsiang-Feng Chen Carroll, Greenwood Village, CO (US)

( * ) Notice: Subject to any disclaimer, the term of this patent is extended or adjusted under 35 U.S.C. 154(b) by 0 days.

(21) Appl. No.: 18/923,557

(22) Filed: Oct. 22, 2024

(51) Int. Cl.
*A61G 13/00* (2006.01)
*A61G 13/12* (2006.01)

(52) U.S. Cl.
CPC ......... *A61G 13/121* (2013.01); *A61G 13/009* (2013.01); *A61G 2200/325* (2013.01)

(58) Field of Classification Search
CPC .............. A61G 13/121; A61G 13/1215; A61G 13/122; A61G 13/1285; A61G 13/009; A61H 1/02; A61H 1/022; A61H 1/0292; A61H 1/0296; A61H 2001/0203; A61H 2001/0207; A61B 90/14; A47C 20/02; A47C 20/026; A47C 20/047; A47C 7/38; A47C 7/383; A47G 9/10; A47G 9/1009; A47G 9/1054
USPC .......................................................... 128/845
See application file for complete search history.

(56) References Cited

U.S. PATENT DOCUMENTS 2,239,003 A 4/1941 Jones
2,398,940 A 4/1946 Jones
3,188,079 A * 6/1965 Boetcker ................ A61G 13/12 5/904
4,620,697 A 11/1986 Pithon
5,177,823 A 1/1993 Riach
5,214,815 A 6/1993 Agbodoe et al.
5,695,501 A * 12/1997 Carol ..................... A61B 90/10 600/417
5,961,512 A * 10/1999 Purnell ................ A61F 5/3761 606/1
6,151,734 A 11/2000 Lawrie
6,397,414 B1 6/2002 Lloyd
6,718,582 B1 4/2004 Tinsley
6,758,447 B2 7/2004 Tinsley
7,036,168 B1 5/2006 Knickerbocker
7,089,613 B2 8/2006 Cohen
7,424,759 B2 9/2008 Damron
7,761,943 B2 7/2010 Roleder et al.
7,882,583 B2 * 2/2011 Skripps ................ A61G 13/101 5/621
7,979,934 B2 7/2011 Roleder et al.
8,360,066 B2 1/2013 Piontek
2006/0290195 A1 * 12/2006 Roleder ................. A61G 7/072 297/397
2007/0251010 A1 * 11/2007 Lara ....................... A61H 37/00 5/620
2020/0306136 A1 * 10/2020 Kemp .................... A61H 37/00

FOREIGN PATENT DOCUMENTS

WO 2014183156 A1 11/2014

* cited by examiner

*Primary Examiner* — Adam Baker
(74) *Attorney, Agent, or Firm* — Smartpat PLC

(57) ABSTRACT

Herein is disclosed an adjustable headrest comprising: a base mountable to a treatment table; a slider rail mounted to the base; a support arm configured to slide along the slider rail; a lockable ball joint mounted to the support arm; a support member mounted to the ball joint; and a faceplate mounted to the support member.

20 Claims, 10 Drawing Sheets

ADJUSTABLE HEADREST

TECHNICAL FIELD

The present invention is directed to apparatus for supporting an individual. More particularly, the present invention is directed to apparatus for supporting an individual's head.

BACKGROUND

Many personal treatments, for example, massage therapy treatments and chiropractic treatments, require an individual to lie upon a treatment table. When lying upon the treatment table, the individual's head must be supported. Ideally, the treatment table can support the individual's head in both a prone and a supine position.

Many treatment tables lack suitable headrests for an individual's head. As such, various headrests that are mountable to a treatment table exist. However, many of the existing headrests suffer various limitations. Such limitations include: supporting the individual's head when either supine or prone, and being limited in the degrees of movement for the headrest, among others.

There is a general desire for an improved adjustable headrest. Additionally, there is a general desire for an adjustable headrest that can support an individual's head in both prone and supine positions.

The foregoing examples of the related art and limitations related thereto are intended to be illustrative and not exclusive. Other limitations of the related art will become apparent to those of skill in the art upon a reading of the specification and a study of the drawings.

SUMMARY

Further aspects and example embodiments are illustrated in the accompanying drawings and/or described in the following description.

One aspect of the invention provides an adjustable headrest comprising: a base mountable to a treatment table; a slider rail mounted to the base; a support arm configured to slide along the slider rail; a lockable ball joint mounted to the support arm; a support member mounted to the ball joint; and a faceplate mounted to the support member.

One aspect of the invention provides a method of supporting an individual's head with an adjustable headrest during a personal treatment, the method comprising: mounting a base of the adjustable headrest to a treatment table; supporting the individual's head with a faceplate of the adjustable headrest while the individual lies upon the treatment table; and one or both of rotating and spinning the faceplate relative to the base, while the personal treatment is performed upon the individual. The personal treatment may include a massage and/or chiropractic treatment of the individual's head, neck, and/or shoulders.

Another aspect of the invention provides a method for providing a dynamic treatment to an individual's head, neck, and/or shoulders using an adjustable headrest. The method comprises supporting the individual's head with a faceplate attached to a ball joint of the adjustable headrest, and one or both of rotating and spinning the ball joint, and thereby the faceplate, during the dynamic treatment.

In some embodiments, the individual's head is supported with the adjustable headrest while the individual is lying either prone or supine upon the treatment table. The adjustable headrest may be mounted to the treatment table in a first configuration when the individual is lying prone upon the treatment table, and in a second configuration when the individual is lying supine upon the treatment table.

In some embodiments, the dynamic treatment may be provided with one or more embodiments of the adjustable headrest as otherwise described herein.

In addition to the exemplary aspects and embodiments described above, further aspects and embodiments will become apparent by reference to the drawings and by study of the following detailed descriptions.

BRIEF DESCRIPTION OF THE DRAWINGS

The accompanying drawings illustrate non-limiting example embodiments of the invention.

DESCRIPTION

Figure 1A:
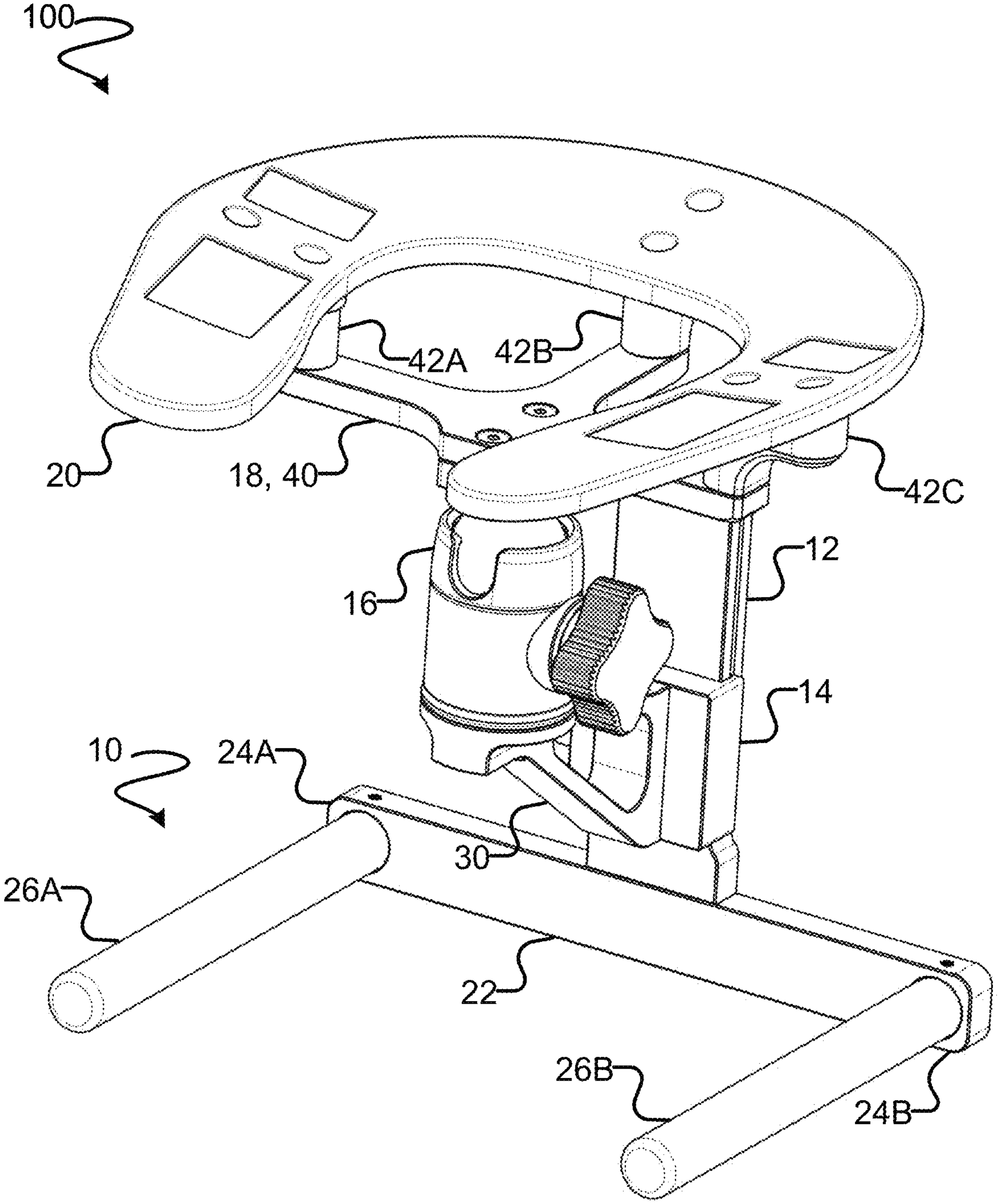
FIG. 1A is a front perspective view of an adjustable headrest in a supine configuration according to an example embodiment of the present invention.
Figure 1B:
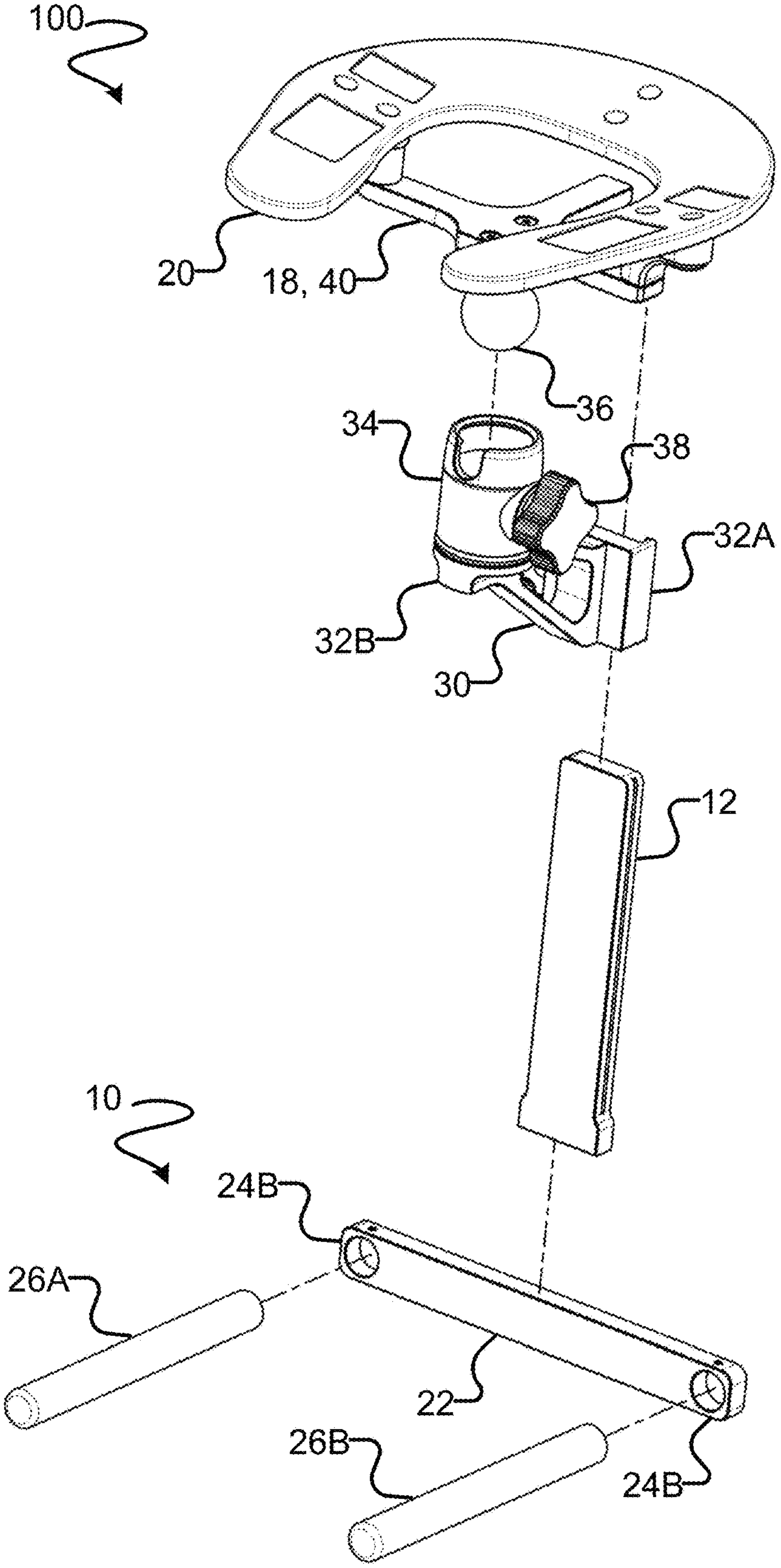
FIG. 1B is an exploded perspective view of the adjustable headrest of FIG. 1A.
Figure 1C:
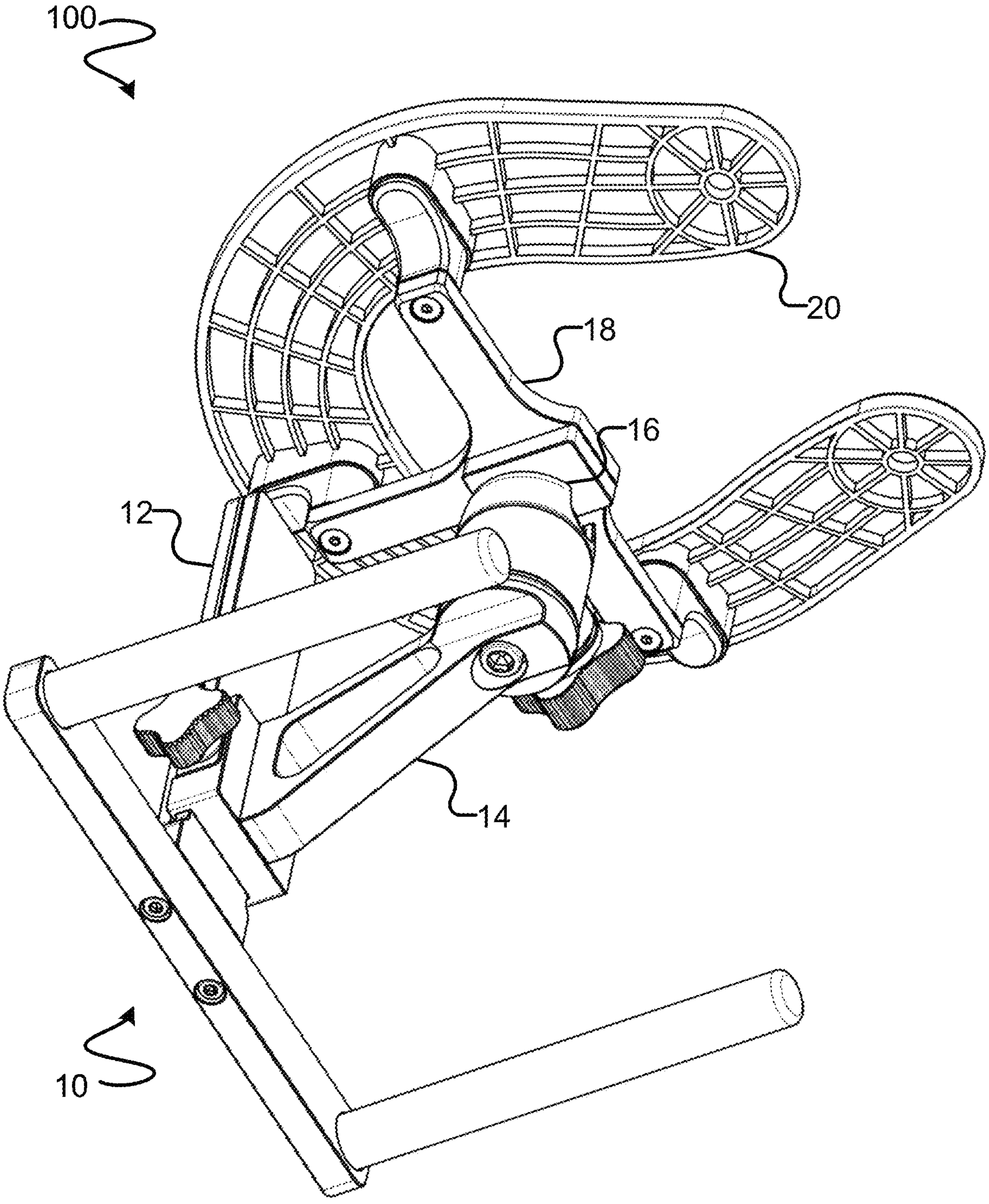
FIG. 1C is a bottom perspective view of the adjustable headrest of FIG. 1A.
Figure 1D:
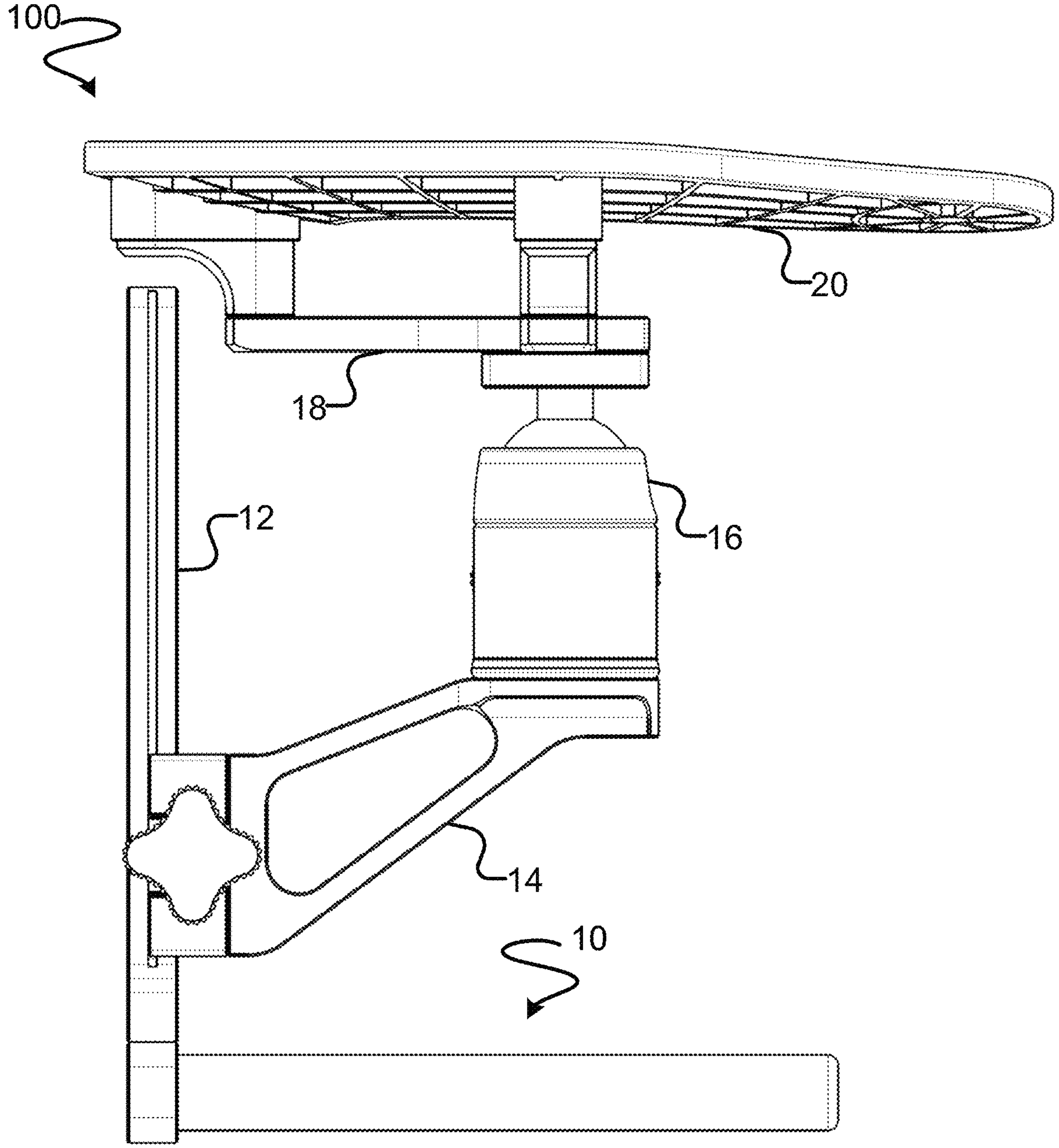
FIG. 1D is a left-side elevation view of the adjustable headrest of FIG. 1A.
Figure 1E:
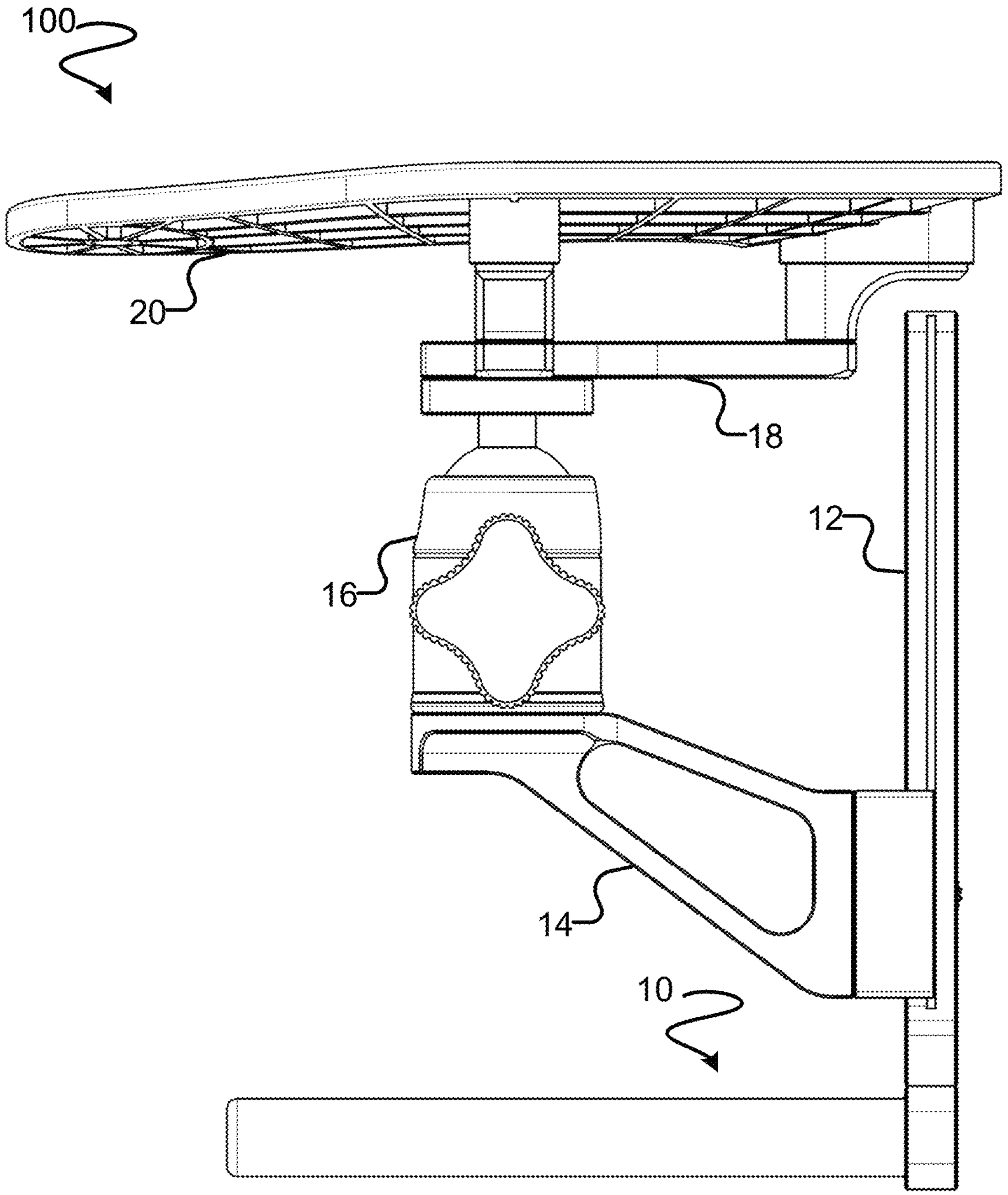
FIG. 1E is a right-side elevation view of the adjustable headrest of FIG. 1A.
Figure 1F:
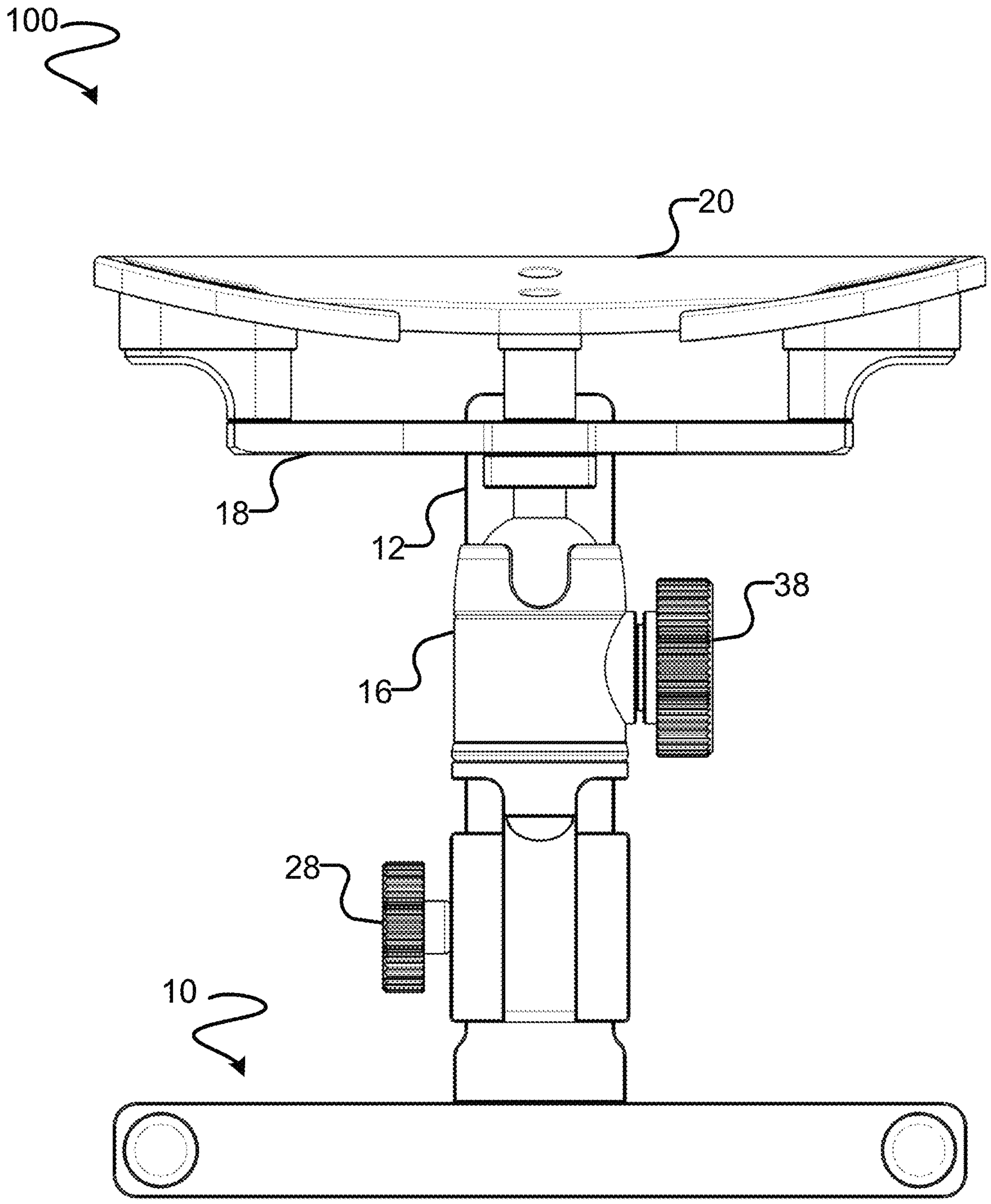
FIG. 1F is a front-side elevation view of the adjustable headrest of FIG. 1A.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

While a number of exemplary aspects and embodiments have been discussed above, those of skill in the art will recognize certain modifications, permutations, additions, and sub-combinations thereof. It is therefore intended that the following claims are interpreted to include all such modifications, permutations, additions, and sub-combinations as are consistent with the broadest interpretation of the specification as a whole.

The same reference numerals may be used across multiple figures to indicate the same elements in the figures. Unless indicated otherwise, the same reference numeral indicates the same element across figures.

FIG. 1A is a front perspective view of adjustable headrest 100 according to an example embodiment of the present invention. Headrest 100 comprises base 10, wherein base 10 is mountable to a treatment table. Headrest 100 further comprises slider rail 12 mounted to base 10, and support arm 14 configured to slide along slider rail 12. Lockable ball joint 16 is mounted to support arm 14, and support member 18 is mounted to ball joint 16. Support member 18 supports faceplate 20, and faceplate 20 is configured to support a cushion (not shown).

Figure 2A:
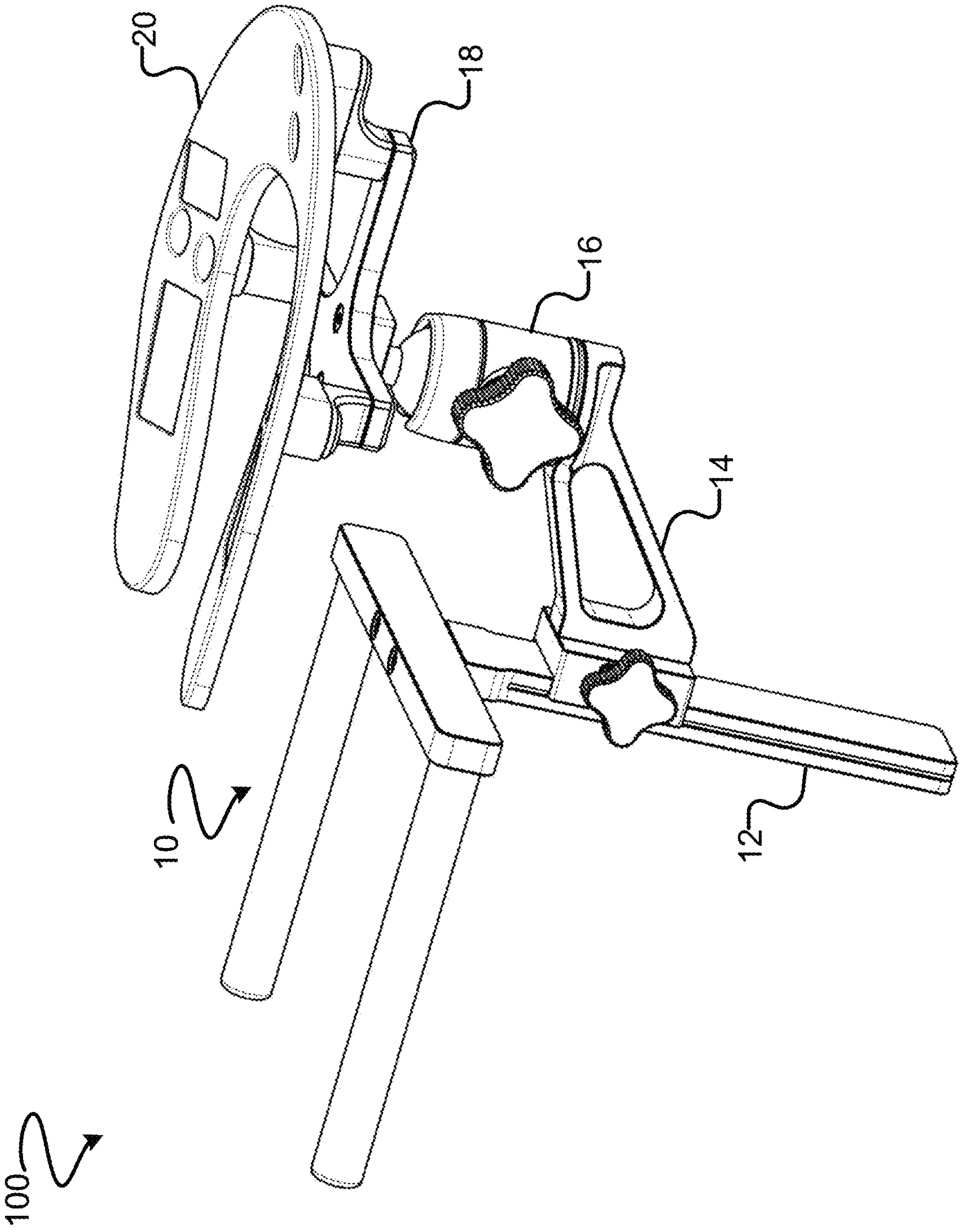
FIG. 2A is a side perspective view of the adjustable headrest of FIG. 1A in a prone configuration.
Figure 2B:
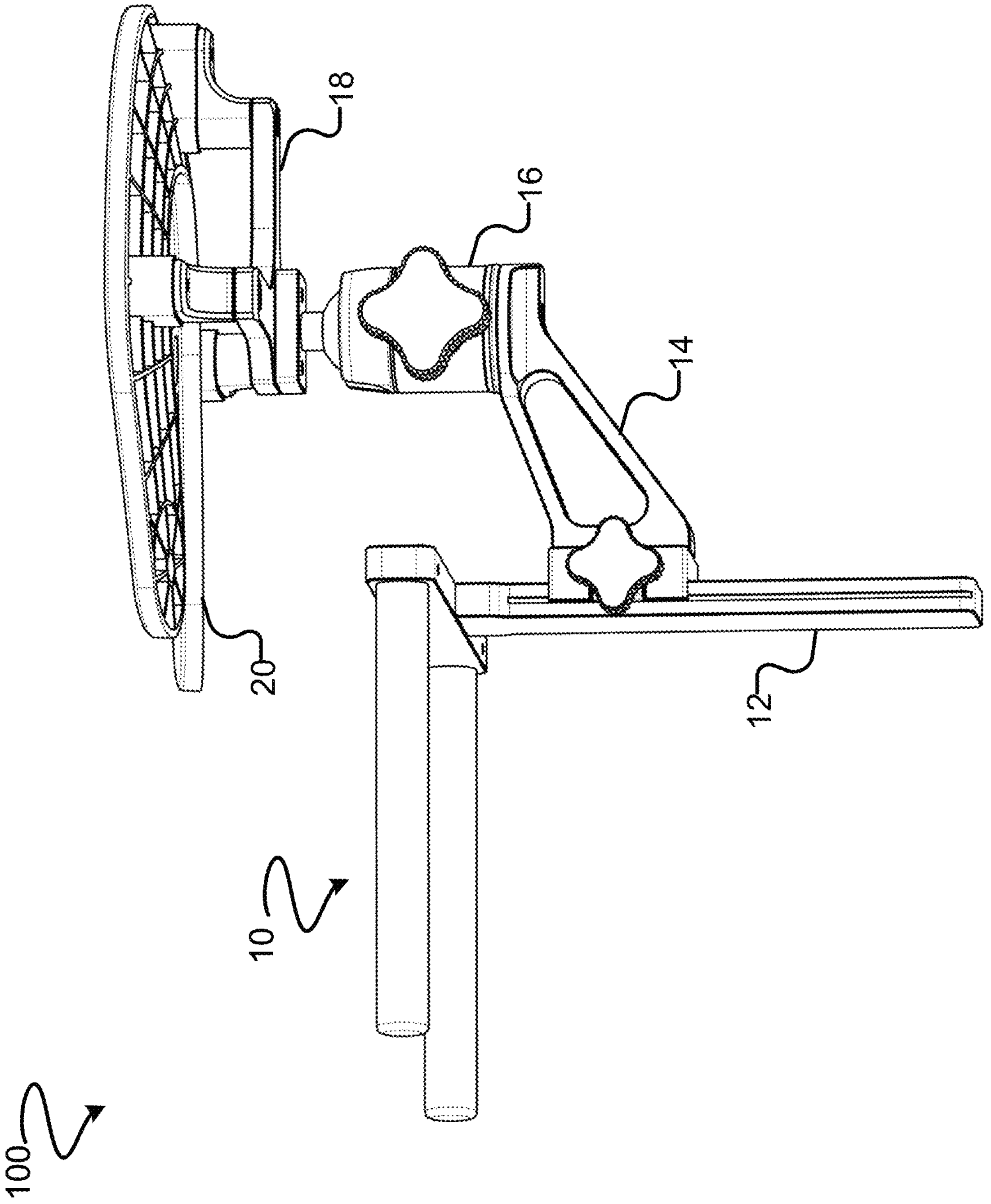
FIG. 2B is a right-side elevation view of the adjustable headrest of FIG. 2A.
Figure 2C:
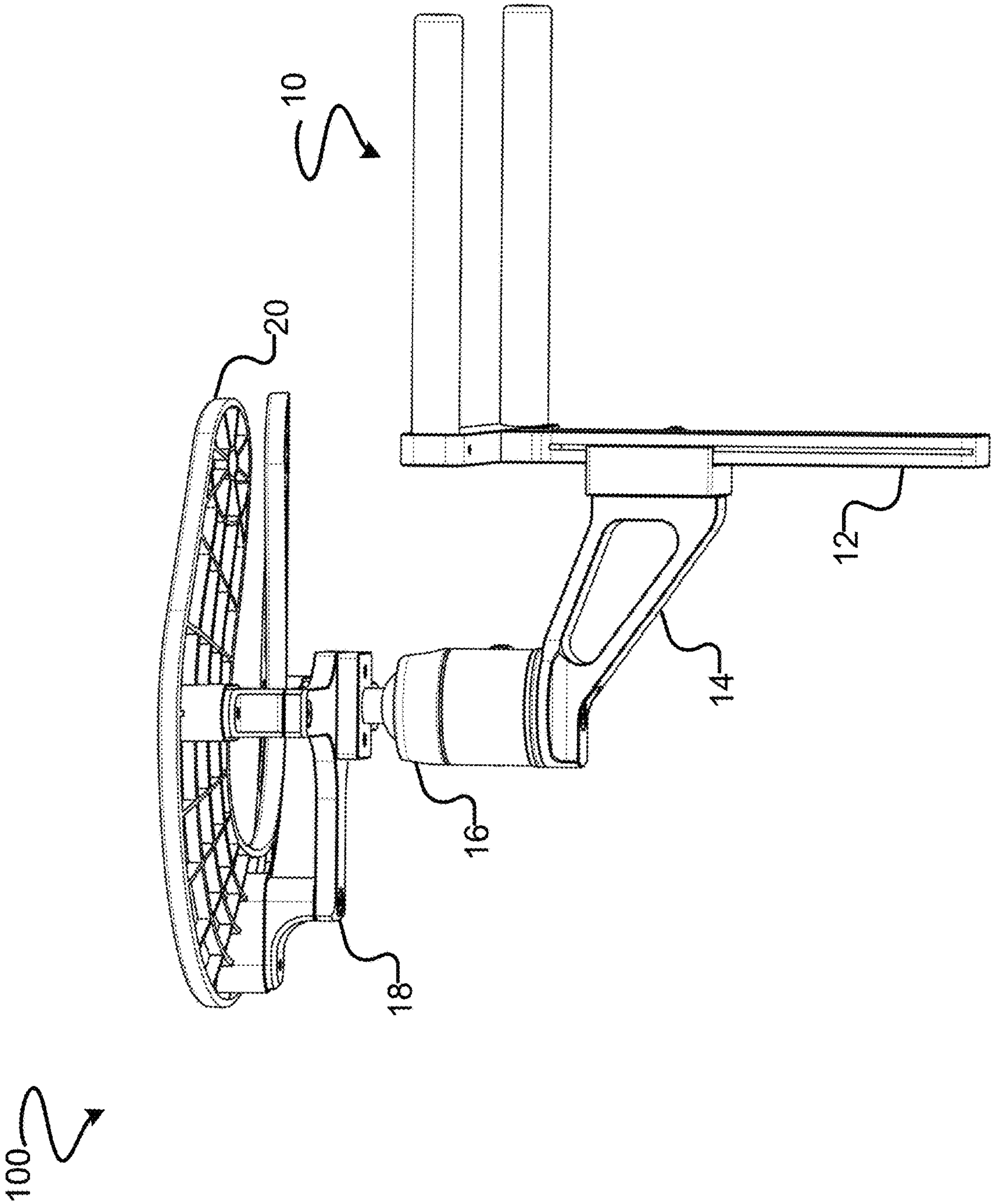
FIG. 2C is a left-side elevation view of the adjustable headrest of FIG. 2A.

FIGS. 1B to 1F are further view of adjustable headrest 100, depicting headrest 100 in a supine configuration. FIGS. 2A to 2C are further view of adjustable headrest 100, depicting headrest 100 in a prone configuration.

Faceplate 20 of headrest 100 may be raised and lowered relative to base 10 by sliding support arm 14 along slider rail 12. Faceplate 20 may be rotated and/or spun relative to base 10 by rotating and/or spinning ball joint 16. Where headrest 100 is mounted to a treatment table, faceplate 20 may be raised, lowered, rotated, and/or spun relative to the treatment table.

Figure 3A:
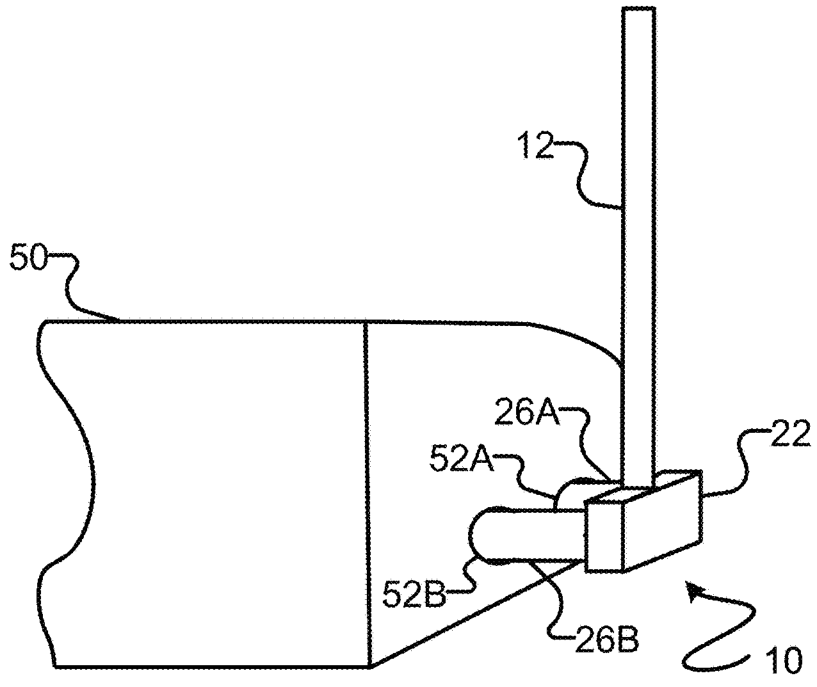
FIGS. 3A and 3B are perspective views of a base and slider rail of an adjustable headrest mounted to a treatment table, according to example embodiments of the present invention.
Figure 3B:
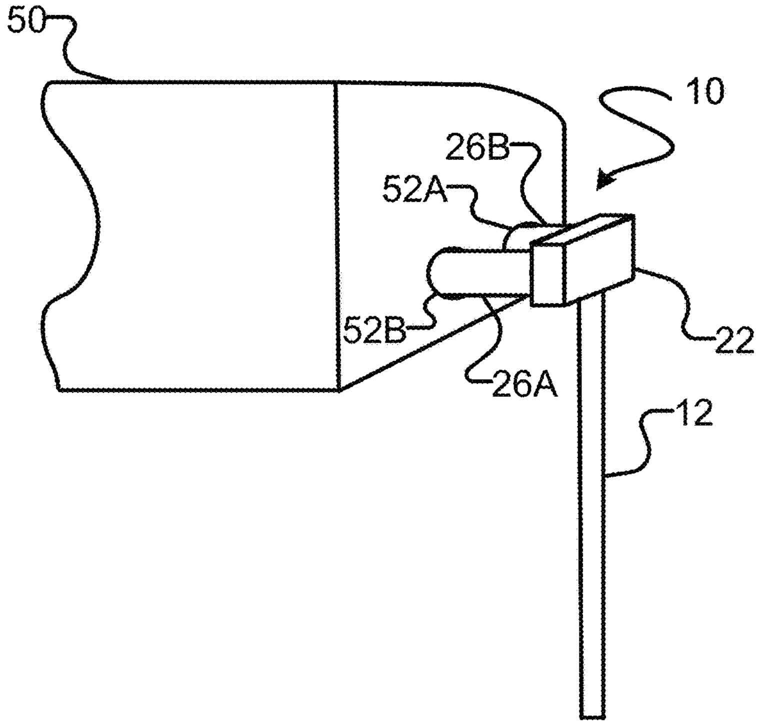

Headrest 100 may be configured and mounted to a treatment table in one of two configurations: a supine configuration as depicted in FIGS. 1A to 1F and 3A, and a prone configuration as depicted in FIGS. 2A to 2C and 3B. In the supine configuration of headrest 100, as depicted in FIG. 3A, base 10 is mounted to treatment table 50 with slider rail 12 extending upwards from treatment table 50. In the prone configuration of headrest 100, as depicted in FIG. 3B, base 10 is mounted to treatment table 50 with slider rail 12 extending downwards from treatment table 50. Mounting base 10 to treatment table 50 in the supine configuration may allow support arm 14 to be raised higher relative to base 10, and thereby higher relative to treatment table 50, than when base 10 is mounted to treatment table 50 in the prone configuration. Mounting base 10 to treatment table 50 in the prone configuration may allow support arm 14 to be lowered lower relative to base 10, and thereby lower relative to treatment table 50, than when base 10 is mounted to treatment table 50 in the supine configuration.

In one or both of the supine configuration and the prone configuration of headrest 100, headrest 100 may facilitate movement of an individual's head during a treatment. For example, by rotating and/or spinning faceplate 20 relative to base 10 during a treatment, an individual's head resting upon faceplate 20 may be rotated and/or spun during the treatment. Such movement of an individual's head during a treatment may enable dynamic treatment of the individual. For example, a treatment professional may apply pressure to a portion of the individual's head, neck, or shoulders, and instead of a conventional technique of moving the application of pressure, the professional may instead move the individual's head relative to the application of pressure. As another example, the treatment professional may move the individual's head to facilitate stretching of the individual's neck and/or shoulders during a treatment.

In some embodiments of headrest 100, base 10 comprises strut 22 having first end 24A and opposing second end 24B (collectively, opposing ends 24). Base 10 further comprises mounting member 26A and 26B (collectively, mounting member 26) mounted to opposing ends 24 of strut 22. Slider rail 12 extends from strut 22 between opposing ends 24 of strut 22.

Mounting members 26 are configured to be mounted to treatment table 50. FIGS. 3A and 3B are schematic diagrams depicting base 10 and slider rail 12 of headrest 100 mounted to treatment table 50 in a prone configuration (FIG. 3A), and a supine configuration (FIG. 3B). FIGS. 3A and 3B depict an embodiment of mounting members 26, wherein each of mounting members 26 comprise a tubular projection.

Tubular mounting members 26 are configured to be received by treatment table 50, for example first aperture 52A and second aperture 52B (collectively, apertures 52) of treatment table 50. In such embodiments, the distance between mounting members 26 equals a distance between apertures 52. Apertures 52 may comprise circular apertures.

In some embodiments, adjustable headrest 100 may be readily reconfigurable between the first configuration and the second configuration. For example, where adjustable headrest 100 comprises tubular projections 26, each of tubular projections 26 are configured to be received by either one of two circular apertures 52 of treatment table 50. Adjustable headrest 100 may be configured in the first configuration by inserting first tubular projection 26A into first circular aperture 52A, and second tubular projection 26B into second circular aperture 52B. Adjustable headrest 100 may then be reconfigured into the second configuration by removing tubular projections 26 from circular apertures 52, and inserting second tubular projection 26B into first circular aperture 52A and first tubular projection 26A into second circular aperture 52B. As such, adjustable headrest 100 may be readily reconfigurable between the first configuration and the second configuration.

In some embodiments, mounting members 26 may further comprise one or more features for securing mounting members 26 to the treatment table. For example, mounting members 26 may comprise one or more clamps (not shown), wherein the clamps secure mounting members 26 to the treatment table, once headrest 100 is mounted to the treatment table.

Support arm 14 is configured to slide along slider rail 12 while being restrained against rotation around slider rail 12. In order to restrain support arm 14 from rotating about slider rail 12, slider rail 12 may have at least one bearing surface which a corresponding surface of support arm 14 slides along. The bearing surfaces may restrain rotation of support arm 14 about slider rail 12 as support arm 14 slides along slider rail 12.

Slider rail 12 may comprise one or more longitudinal grooves, and support arm 14 may have a corresponding number of projections configured to slide through the longitudinal grooves of slider rail 12 as support arm 14 slides along slider rail 12. The grooves of slider rail 12 and corresponding projections of support arm 14 may hold support arm 14 to slider rail 12, while permitting support arm 14 to slide along slider rail 12. Furthermore, the grooves and projections may further restrain rotation of support arm 14 about slider rail 12.

One or both of slider rail 12 and support arm 14 may further comprise features for arresting the sliding of support arm 14 along slider rail 12. For example, support arm 14 may comprise clamp 28, wherein clamp 28 selectively locks support arm 14 to slider rail 12. In some embodiments, clamp 28 comprises a thumb screw configured to screw through support arm 14 and press against the slider rail 12, thereby arresting the sliding of support arm 14 along slider rail 12.

Support arm 14 may comprise spar 30 having first end 32A and second opposing end 32B. First end 32A of spar 30 may be configured to slide along slider rail 12, and ball joint 16 may be mounted to second end 32B of spar 30. In some embodiments, spar 30 comprises a projection configured to slide along a longitudinal groove of slider rail 12.

Ball joint 16 may comprise socket 34 and ball and stud 36 sitting in socket 34. In some embodiments, socket 34 of ball joint 16 is mounted to support arm 14. For example, where support arm 14 comprises spar 30, socket 34 may be mounted to second end 32B of spar 30. Faceplate 20 may be mounted to the stud of ball and stud 36.

To selectively lock ball joint 16, ball joint 16 may further comprise thumb screw 38 configured to screw through socket 34 and press against the ball of ball and stud 36, thereby locking the ball of ball and stud 36 against rotating within socket 34. Thumb screw 38 may comprise a threaded bar, and stud 36 may form a threaded aperture configured to receive the threaded bar of thumb screw 38. Thumb screw 38 may further comprise a knob to facilitate screwing the threaded bar through the threaded aperture and bearing down of the threaded bar against the ball of ball and stud 36.

In some embodiments, support member 18 comprises central body 40 mounted to ball joint 16 and three arms 42A, 42B and 42C (collectively, arms 42) extending from central body 40. Each of arms 42 may comprise a flexibly resilient riser, wherein the risers support faceplate 20. The risers may deflect and/or compress to facilitate passive adjustment of faceplate 20 to an individual's head. Passive adjustment of faceplate 20 means lowering of one or more of the risers to shift weight from the lowered risers to the other risers, thereby redistributing the weight between the risers.

Faceplate 20 may comprise a U-shaped plate supported by arms 42. In some embodiments, U-shaped faceplate 20 is evenly supported by arms 42. Evenly supported may mean each of arms 42 supports a generally similar weight of faceplate 20, when faceplate 20 supports an individual's head. U-shaped faceplate 20 may support an individual's forehead and cheeks when the individual is in a prone position without supporting the individual's chin, thereby removing any pressure from the individual's chin.

In some embodiments, headrest 100 is configured to support an individual's head in both a prone position and a supine position. Support arm 14 may be configured to slide to a first position along slider rail 12 for supporting the individual's head in the prone position, and to a second position along slider rail 12 for supporting the individual's head in the supine position. In some embodiments, base 10 may be configured to be mounted to a treatment table in two configurations, a first configuration wherein slider rail 12 extends upward from base 10, and a second configuration wherein slider rail 12 extends downwards from base 10. In such embodiments, upwards is defined away from the ground, and downwards is defined as towards the ground.

Support arm 14 may be configured to slide along slider rail 12 when slider rail 12 extends either upwards from or downwards from base 10. In some embodiments, slider rail 12 may form two longitudinal grooves along opposing sides of slider rail 12, and support arm 14 may have two corresponding projections. As such, each of the projections of support arm 14 may slide through either of the grooves of slider rail 12. This allows support arm 14 to slide along slider rail 12 when base 10 is mounted in either a prone or a supine configuration, as otherwise described herein.

The first configuration of base 10 with slider rail 12 extending upwards may support the individual's head in the supine position, and the second configuration of base 10 with slider rail 12 extending downwards may support the individual's head in the prone position. The second configuration of base 10 may allow headrest 20 to be lowered lower relative to the treatment table than the first configuration of base 10. As such, the second configuration of base 10 may permit a wider range of heights for headrest 20 suitable for supporting the individual's head in the prone position relative to the treatment table. Similarly, the second configuration of base 10 may permit a wider range of heights for headrest 20 relative to the treatment table and therefore suitable for supporting the individual's head in the supine position. Accordingly, headrest 100 may support a wider range of headrest heights relative to the treatment table than if base 10 were mountable to the treatment table in only the first or the second configuration.

Example Embodiments

In some embodiments of the present invention, each of mounting members 26 and apertures 52 form in cross section a symmetrical shape. Examples of symmetrical shapes include: a circle, an oval, a square, a rectangle, and the like.

In one or more embodiments of the present invention:

support arm 14 is slidable along slider rail 12 in increments of less than 2 cm;

ball joint 16 is rotatable in either one of the two degrees of rotation in increments of less than 0.5 degrees;

faceplate 20 is lowerable and raisable along slider rail 12, and may pitch, yaw, and roll about ball joint 16;

one or more of the base, slider rail, support arm, ball joint, and faceplate comprise anodized aluminum;

the thumb screws permit smooth movement of the faceplate along the slider rail, and smooth rotation of the faceplate about the ball joint, thereby allowing precise movements of less than 0.5 degrees; and/or a cushion is attached to faceplate 20.

Interpretation of Terms

Unless the context clearly requires otherwise, throughout the description and the "comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Where a component (e.g. a ball joint, faceplate, slider rail, support arm, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one, or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

The invention claimed is:

1. An adjustable headrest comprising:

a base mountable to a treatment table;

a slider rail mounted to the base;

a support arm configured to slide along the slider rail;

a lockable ball joint mounted to the support arm;

a support member mounted to the ball joint; and a faceplate mounted to the support member, wherein the support arm is configured to slide to a first position along the slider rail and a second position along the slider rail, wherein the faceplate is configured to support an individual's head in a prone position when the support arm is at the first position, wherein the faceplate is configured to support the individual's head in a supine position when the support arm is at the second position, wherein the slider rail has a first side and an opposing second side, wherein the support arm extends from the first side of the slider rail when the support arm is at the first position, and the support arm extends from the second side of the slider rail when the support arm is at the second position, wherein the base comprises a strut having two opposing ends and two mounting members attached to the opposing ends of the strut, wherein the slider rail extends from the strut between the opposing ends of the strut, wherein the support arm extends over the two mounting members when the slider rail is at the first position, and wherein the support arm extends from the slider rail opposing the two mounting members when the slider rail is at the second position.

2. The adjustable headrest of claim 1, wherein the mounting members each comprise a tubular projection configured to be received by the treatment table.

3. The adjustable headrest of claim 2, wherein one or both of the mounting members comprise a clamp for securing the mounting members to the treatment table.

4. The adjustable headrest of claim 1, wherein the slider rail forms a longitudinal groove, and the support arm comprises a projection configured to slide through the longitudinal groove of the slider rail.

5. The adjustable headrest of claim 4, wherein the support arm further comprises a clamp configured to lock the support arm to the slider rail.

6. The adjustable headrest of claim 5, wherein the clamp comprises a thumb screw configured to screw through the support arm and bear against the slider rail.

7. The adjustable headrest of claim 4, wherein the support arm further comprises a spar having a first end and an opposing second end, the projection extends from the first end, and the ball joint is mounted to the second end.

8. The adjustable headrest of claim 1, wherein the ball joint further comprises a socket mounted to the support arm and a ball and stud sitting in the socket, and the support member is mounted to the stud.

9. The adjustable headrest of claim 8, wherein the ball joint further comprises a thumb screw configured to screw through the socket and bear against the ball, thereby locking the ball against rotation within the socket.

10. The adjustable headrest of claim 1, wherein the support member comprises a central body mounted to the ball joint and three arms extending from the central body.

11. The adjustable headrest of claim 10, wherein each of the three arms comprises a flexibly resilient riser.

12. The adjustable headrest of claim 11, wherein the faceplate comprises a U-shaped plate, and the U-shaped plate is evenly supported by the three arms.

13. The adjustable headrest of claim 1, wherein the faceplate is configured to support the individual's forehead and cheeks in the prone position without supporting the individual's chin.

14. The adjustable headrest of claim 1, wherein the support arm is slidable along the slider rail in increments of less than 2 cm.

15. The adjustable headrest of claim 1, wherein the ball joint is rotatable in increments of less than 0.5 degrees.

16. The adjustable headrest of claim 1, wherein the faceplate is movable along the slider rail, and the faceplate is able to pitch, yaw, and roll about the ball joint.

17. The adjustable headrest of claim 16, wherein a thumb screw permits smooth movement of the faceplate along the slider rail, and smooth rotation of the faceplate about the ball joint.

18. The adjustable headrest of claim 1, wherein one or more of the base, slider rail, support arm, ball joint, and faceplate comprise anodized aluminum.

19. The adjustable headrest of claim 1, wherein the support arm is configured to slide in either one of two orientations 180 degrees from each other and along either the first side or the opposing second side of the slider rail.

20. The adjustable headrest of claim 19, wherein the support arm is configured to slide along the first side of the slider rail in a first one of the two orientations when the slider rail is at the first position, and along the opposing second side of the slider rail in a second one of the two orientations when the slider rail is at the second position.

* * * * *